United States Patent [19]

Torcomian

[11] Patent Number: 4,881,751
[45] Date of Patent: Nov. 21, 1989

[54] ARTICULATED TRUCK/TRAILER COMBINATION: SECOND CARGO UNIT COUPLING MECHANISM

[75] Inventor: Albert Torcomian, Havertown, Pa.

[73] Assignee: LHT Industries, Inc., Bala Cynwyd, Pa.

[21] Appl. No.: 273,126

[22] Filed: Nov. 17, 1988

Related U.S. Application Data

[63] Continuation of Ser. No. 1,057, Jan. 7, 1987, abandoned.

[51] Int. Cl.$^4$ .............................................. B60D 1/00
[52] U.S. Cl. .................................. 280/457; 280/495; 280/504
[58] Field of Search ............... 280/457, 493, 495, 503, 280/504, 507, 512, 514, 415 B, 415 A, 406 R, 406 A, 400, 480

[56] References Cited

U.S. PATENT DOCUMENTS

| | | | |
|---|---|---|---|
| 1,707,345 | 4/1929 | Brown | 280/423 |
| 2,053,255 | 9/1936 | Ferguson et al. | 280/457 |
| 2,317,972 | 5/1943 | Ash | 280/423 |
| 2,553,959 | 5/1951 | Cook | 280/33.05 |
| 2,864,627 | 12/1958 | Kleinknecht | 280/423 |
| 2,889,155 | 6/1959 | Sandage | 280/495 X |
| 3,004,772 | 10/1961 | Bohlen et al. | 280/415 |
| 3,024,870 | 3/1962 | Kramcsak, Jr. et al. | 254/418 |
| 3,128,107 | 4/1964 | Miller et al. | 280/457 |
| 3,151,881 | 6/1963 | Walther | 280/408 |
| 3,163,306 | 12/1964 | Bennett et al. | 280/408 |
| 3,172,685 | 3/1965 | Mandekic | 280/445 |
| 3,237,966 | 3/1966 | Ayers | 280/408 |
| 3,246,912 | 4/1966 | Cunha | 280/407 |
| 3,314,692 | 4/1967 | Karns | 280/475 |
| 3,374,010 | 3/1968 | Crockett et al. | 280/415 |
| 3,391,950 | 7/1968 | Carter et al. | 280/421 |
| 3,413,016 | 11/1968 | Bertolini | 280/415 |
| 3,463,513 | 8/1969 | Burton | 280/495 |
| 3,484,852 | 12/1969 | Norrie et al. | 280/476 |
| 3,537,727 | 11/1970 | Tantlinger et al. | 280/415 |
| 3,567,252 | 3/1971 | Zubko | 280/415 |
| 3,627,352 | 12/1971 | Canole | 280/475 |
| 3,632,086 | 1/1972 | Mai | 254/419 |
| 3,718,346 | 2/1973 | Self et al. | 280/415 |
| 3,737,177 | 6/1973 | Gal | 280/495 |

(List continud on next page.)

FOREIGN PATENT DOCUMENTS

| | | | |
|---|---|---|---|
| 147135 | 10/1950 | Australia | 280/495 |
| 471852 | 3/1951 | Canada | 280/480 |
| 1780189 | 1/1973 | Fed. Rep. of Germany | 280/495 |
| 2846080 | 4/1979 | Fed. Rep. of Germany | 280/504 |
| 2210847 | 6/1979 | Fed. Rep. of Germany | 280/495 |
| 1479487 | 3/1967 | France | 280/421 |
| 468272 | 3/1969 | Switzerland | |
| 1119897 | 10/1984 | U.S.S.R. | 105/378 |
| 996439 | 6/1965 | United Kingdom | 280/763.1 |

OTHER PUBLICATIONS

M. Persia, "Why the Articulated Multi-Trailer Truck?. . .", ATA (an Italian publication), pp. 403-446 (with English translation).

Primary Examiner—Mitchell J. Hill
Attorney, Agent, or Firm—Panitch Schwarze Jacobs and Nadel

[57] ABSTRACT

In a cargo-carrying vehicle having a power unit, a first cargo-carrying unit releasably affixed to the power unit, the first cargo-carrying unit not being pivotal on the power unit, and a second cargo-carrying unit releasably and pivotally connected to the first cargo-carrying unit, wherein the improvement comprises:
a drawbar affixed to said cargo-carrying unit;
an eye affixed to a free end of said drawbar;
a safety hook connected to said drawbar;
a chassis affixed to said first cargo-carrying unit;
a ring affixed to said chassis and adapted to receive said safety hook; and
a coupler affixed to said chassis and adapted to engage said eye.

1 Claim, 14 Drawing Sheets

U.S. PATENT DOCUMENTS

| | | | |
|---|---|---|---|
| 3,791,664 | 2/1974 | Self et al. | 280/124 |
| 3,806,159 | 4/1974 | Self et al. | 280/423 |
| 3,836,178 | 9/1974 | Ham | 280/415 |
| 3,841,511 | 10/1974 | Haun | 280/415 B X |
| 3,950,011 | 4/1976 | Yamanaka | 280/432 |
| 3,964,768 | 6/1976 | Reynolds | 280/495 |
| 3,984,891 | 10/1976 | Weinmann | 14/69.5 |
| 3,996,860 | 12/1976 | Ravani et al. | 105/378 |
| 4,049,289 | 9/1977 | Deckrow | 280/423 |
| 4,084,516 | 4/1978 | Ravani et al. | 106/378 |
| 4,111,450 | 9/1978 | Pinto | 280/408 |
| 4,132,326 | 1/1979 | Pinto | 280/423 |
| 4,262,920 | 4/1981 | Mettetal | 280/411 |
| 4,303,258 | 12/1981 | Davis | 280/403 |
| 4,318,349 | 3/1982 | Galasan | 105/378 |
| 4,365,820 | 12/1982 | Rush | 280/411 |
| 4,379,585 | 4/1983 | Strick | 296/146 |
| 4,397,474 | 8/1983 | Mettetal | 280/423 |
| 4,475,740 | 10/1984 | Strick | 280/403 |
| 4,526,395 | 7/1985 | Arguin | 280/408 |
| 4,557,497 | 12/1985 | Rumminger | 280/403 |
| 4,645,227 | 2/1987 | Callahan | 280/504 X |

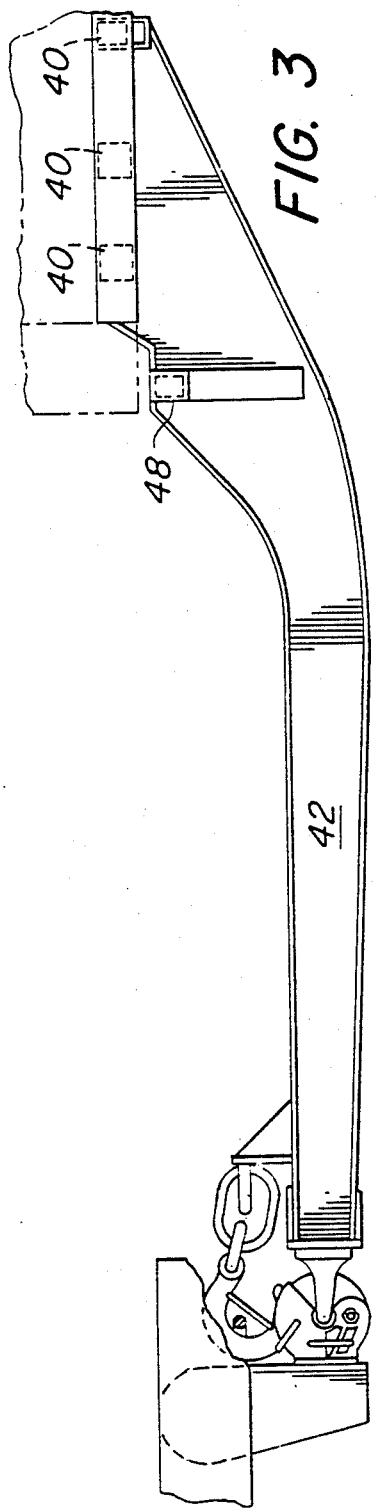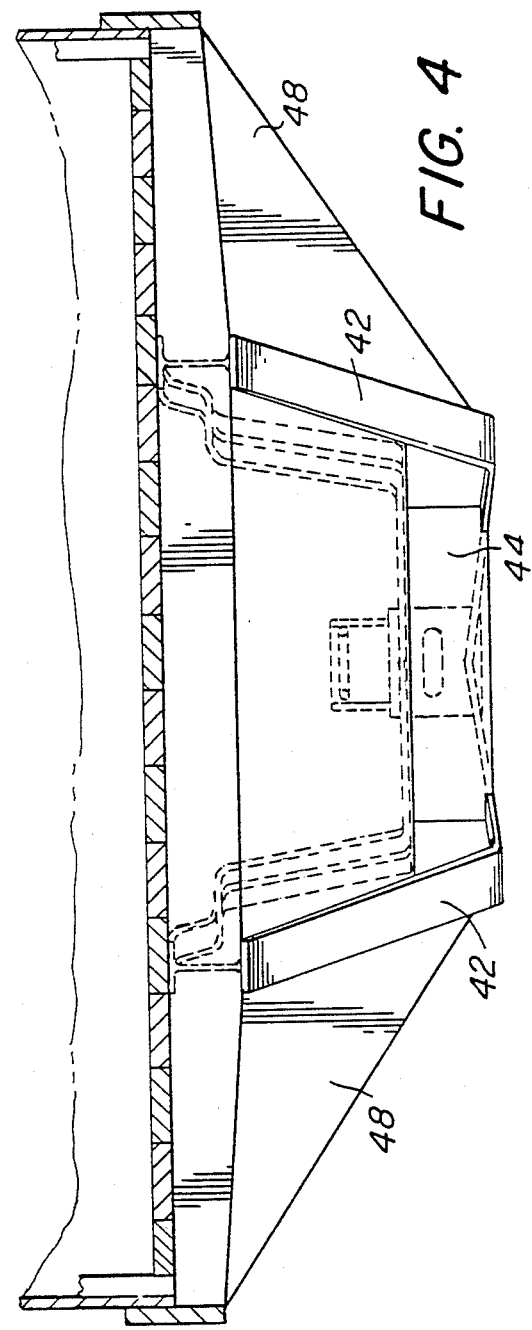

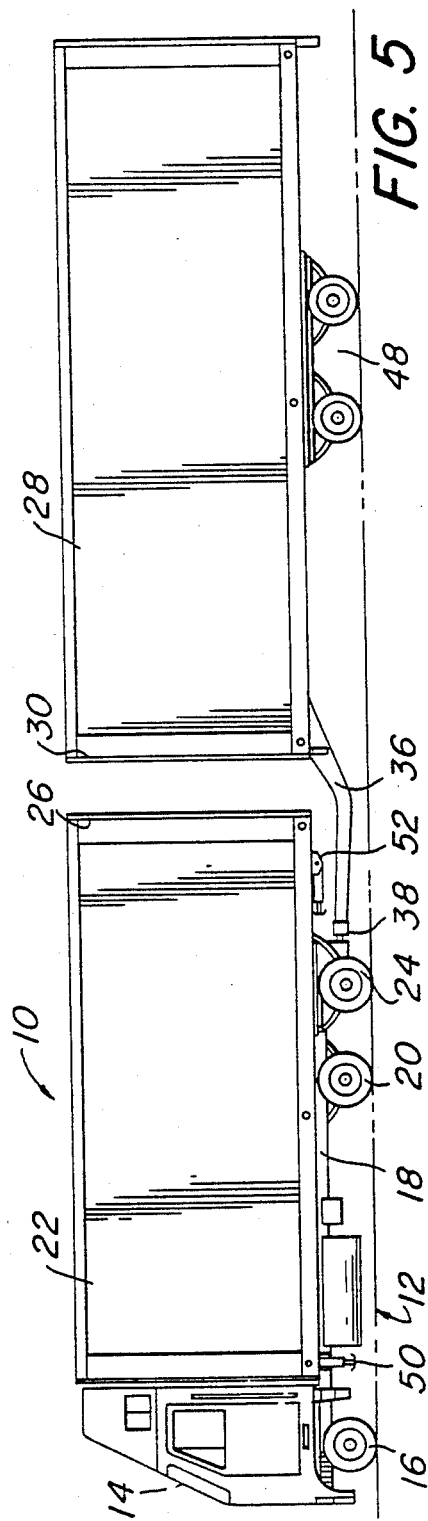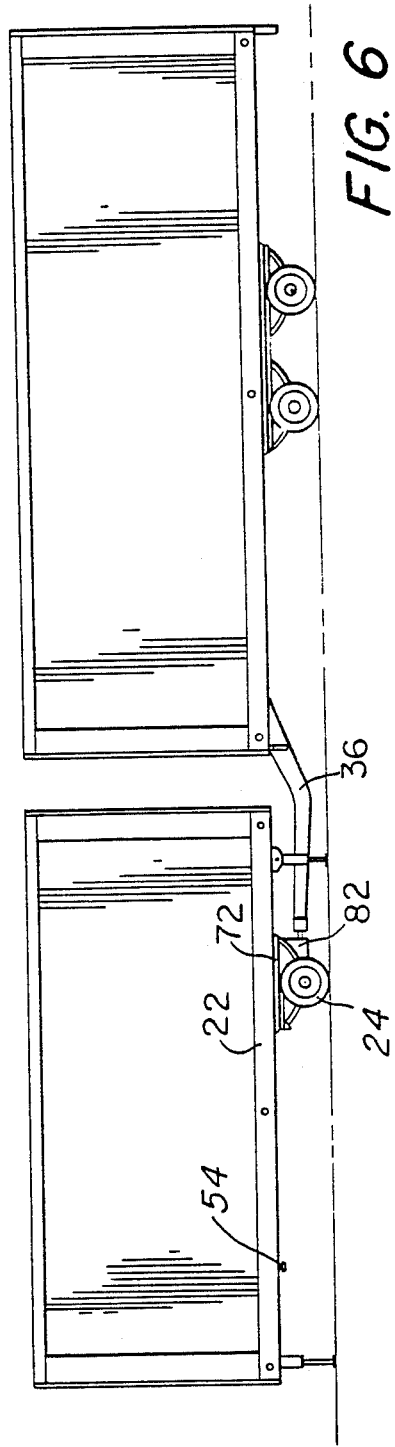

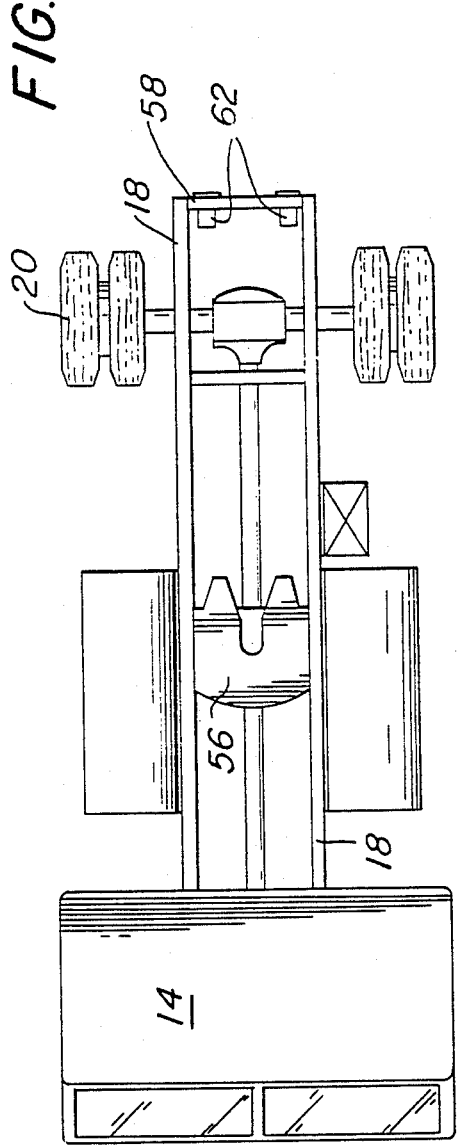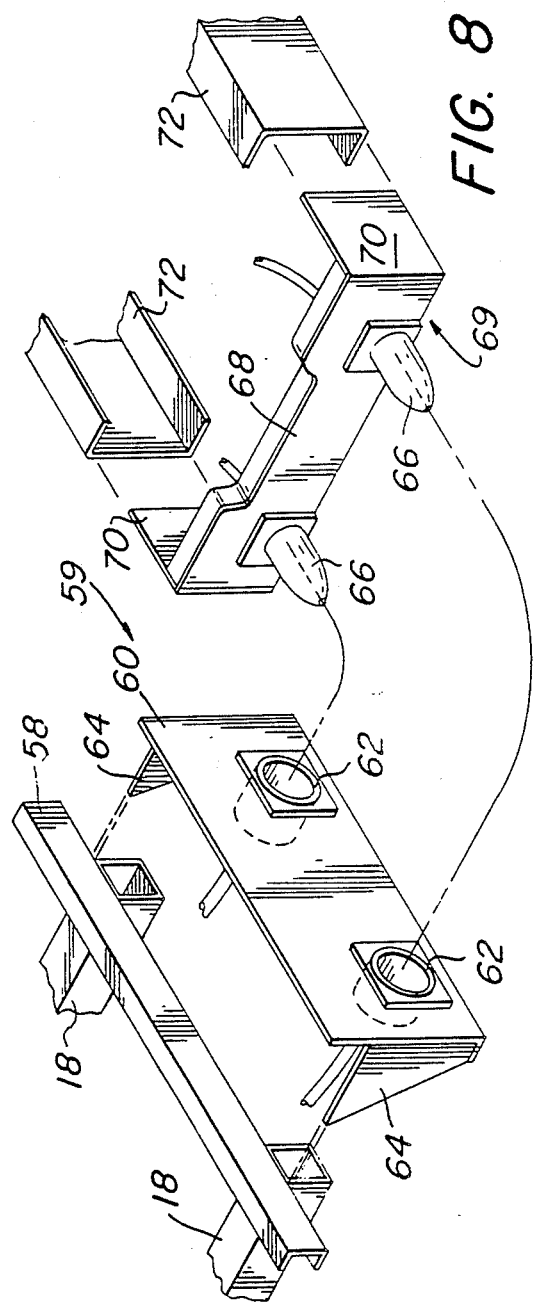

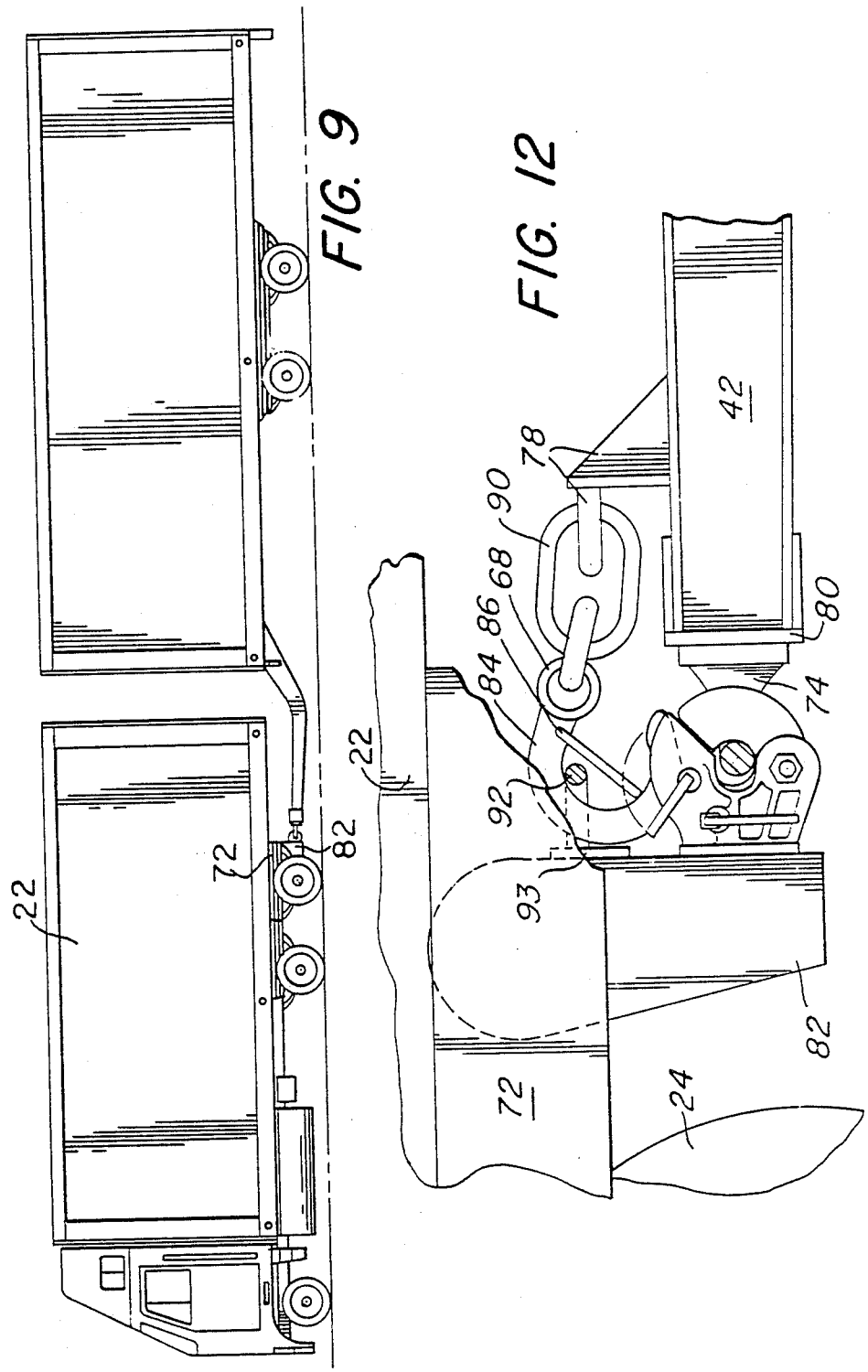

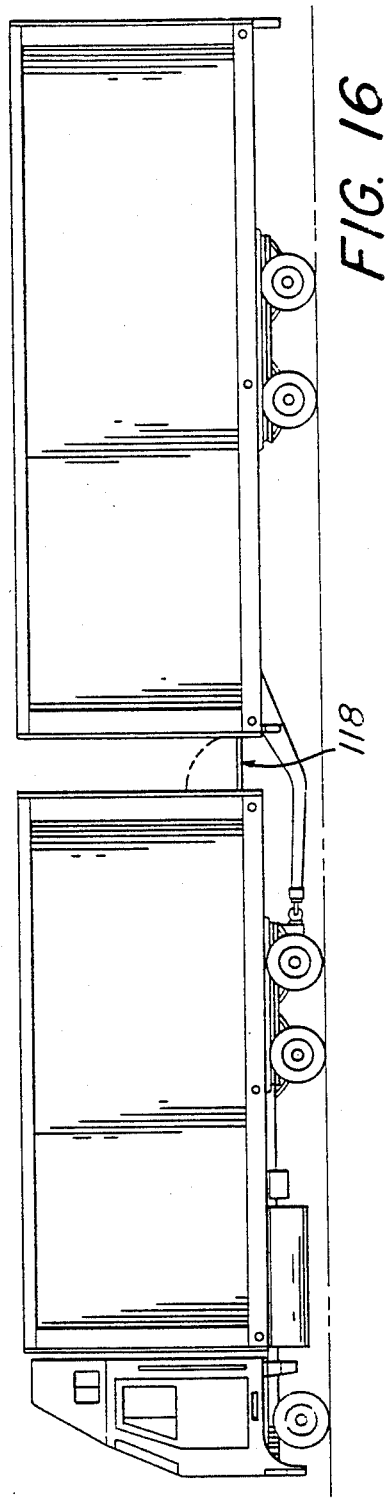
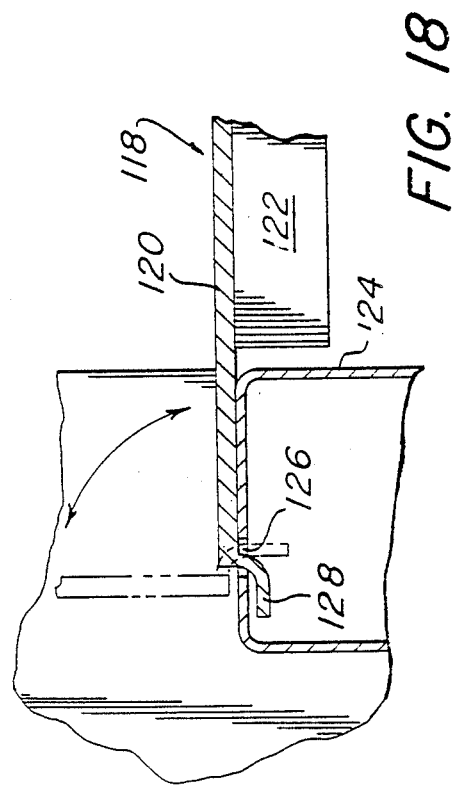

ARTICULATED TRUCK/TRAILER COMBINATION: SECOND CARGO UNIT COUPLING MECHANISM

This is a continuation of application Ser. No. 001,057 filed Jan. 7, 1987, now abandoned.

SCOPE OF THE INVENTION

These inventions are related to improvements in a cargo-carrying vehicle. The specific cargo-carrying vechicle comprises: a power unit; a first cargo-carrying unit releasably affixed to the power unit, but not pivotal on the power unit; and a second cargo-carrying unit which is releasably and pivotally connected to the first cargo-carrying unit.

BACKGROUND OF THE INVENTION

The present inventions are a result of further research and development of the "Articulated Truck/Trailer Combination" set forth in U.S. Pat. No. 4,475,740 which is assigned to the assignee to the above-identified inventions and incorporated herein by reference.

The most significant problem in the design of the U.S. Pat. No. 4,475,740 truck/trailer combination is the failure of the drawbar which connects the second cargo-carrying unit to the first cargo-carrying unit. Specifically, the failure of the drawbar was due to the connection of the drawbar to the floor of the first cargo-carrying unit. Additionally, the power unit and first cargo-carrying unit have been re-designed to improve the lateral and vertical stability of the entire combination, so as to assure highway safety.

Other tractor/trailer combinations are known which utilize at least two cargo-carrying bodies and are pivotally connected to each other. For example, in U.S. Pat. No. 3,237,966 (Ayers), there is shown a combination of vehicles including a tractor having a trailer body rigidly secured thereto by a coupling or hitch so that the body is closely adjacent the tractor cab, like in a truck. A trailer body is connected to the truck body by a conventional hitch.

In U.S. Pat. No. 3,484,852 (Norrie et al), there is shown a combination vehicle comprising a tractor on which a trailer body is secured, a second trailer is connected to the body of the first trailer, via a tow bar and eye.

In U.S. Pat. No. 3,841,511 (Haun), there is shown a combination vehicle comprising a first modular cargo body releasably secured on the frame of a tractor and a second similar body mounted on a pair of carriage units. The front carriage unit is connected to the frame of the tractor via a drawbar.

In U.S. Pat. No. 4,303,258 (Davis), there is shown an improved animal carrier wherein a pick-up truck having an animal enclosure thereon is connected via a hitch to a trailer. The forwardmost portion of the trailer includes a pair of doors and a walk ramp which extends from the trailer to the rear of the pickup truck. Accordingly, the trailer/pickup combination has a complete walk through cargo space.

In U.S. Pat. No. 3,163,306 (Bennett et al) a multiple unit trailer and containers are disclosed. A power unit having a cab mounted on a chassis front wheel disposed under the cab and rear wheels mounted on the chassis and a fifth wheel located adjacent said rear wheels. A dolly having a pair of wheels, a fifth wheel located above the pair of wheels, and a kingpin for engagement with the fifth wheel of the power unit is adapted to receive containers thereon. A second semi-trailer having landing gear, rear wheels located at the rearward most end of said trailer and a kingpin for engagement with the fifth wheel of said dolly is adapted for receipt of containers thereon. In FIG. 5, landing gear 52 for dolly 14 is disclosed. In FIG. 13, tapered plug 75 are disclosed. Tapered plug 75 engage with tapered slots 50 to secure rear semi-trailer 16 to truck dolly 14.

SUMMARY OF THE INVENTION

In a cargo-carrying vehicle having a power unit, a first cargo-carrying unit releasably affixed to the power unit, the first cargo-carrying unit not being pivotal on the power unit, and a second cargo-carrying unit releasably and pivotally connected to the first cargo-carrying unit, wherein the improvement comprises:

a drawbar affixed to said cargo-carrying unit;
an eye affixed to a free end of said drawbar;
a safety hook connected to said drawbar;
a chassis affixed to said first cargo-carrying unit;
a ring affixed to said chassis and adapted to receive said safety hook; and
a coupler affixed to said chassis and adapted to engage said eye.

The cargo-carrying vehicle described herein maximizes cargo carrying capacity (volume) while complying with applicable law. DOT allows semi-trailer's dimensions of 65 ft. front to rear, 13.6 ft. in height and 102 inches plus 6 millimeters in width. This vehicle provides approximately 5000 cubic feet of cargo carrying capacity. The largest unit available today (57 foot trailers) provides only about 4200 cubic feet.

The cargo space of the present invention is easily accessible. The cargo carrying units are provided with doors which allow access between the units. Rollover plates bridge the gap between the units so that cargo can be loaded and unloaded from the rear of the unit while the units are coupled. The doors are designed to swing outside the cargo units so that the cargo space is completely unobstructed for loading.

The present vehicle, while providing maximum cargo carrying capacity, is very maneuverable. The present vehicle is superior to "tandem" (or double) vehicles which have two points of articulation. The present vehicle has only a single point of articulation. This feature provides a number of advantages. First, safety is greatly enhanced because jack-knifing is discouraged. Second, the turning radius is about 37 feet. Third, "off-tracking" is only about 10 feet. "Off-tracking" is the difference in turning radius between the path of a vehicle's front axle centerpoint follows during a turn and the path its rear axle centerpoint follows during the turn. Fourth, the vehicle can be backed up, tandem (double) vehicles cannot be backed up. These advantages stem from the unique drawbar design.

The coupling unit for the first cargy carrying unit improves the lateral and vertical stability of the vehicle. The cargo carrying units are structurally sound.

DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 3 is an enlarged elevational view of a preferred embodiment.

FIG. 4 is an enlarged elevational end view of a preferred embodiment, parts broken away for clarity.

FIG. 5 is an elevational view of a preferred embodiment.

FIG. 6 is an elevational view of a preferred embodiment.

FIG. 7 is a top plan view of a preferred embodiment.

FIG. 8 is an isometric view of a preferred embodiment, parts being broken away for clarity.

FIG. 9 is an elevational view of a preferred embodiment.

FIG. 12 is an enlarged elevational view of a preferred embodiment.

FIG. 16 is an elevational view of a preferred embodiment.

FIG. 18 is a sectional view of a preferred embodiment, parts being broken away for clarity.

DETAILED DESCRIPTION OF THE INVENTION

Figure 1:
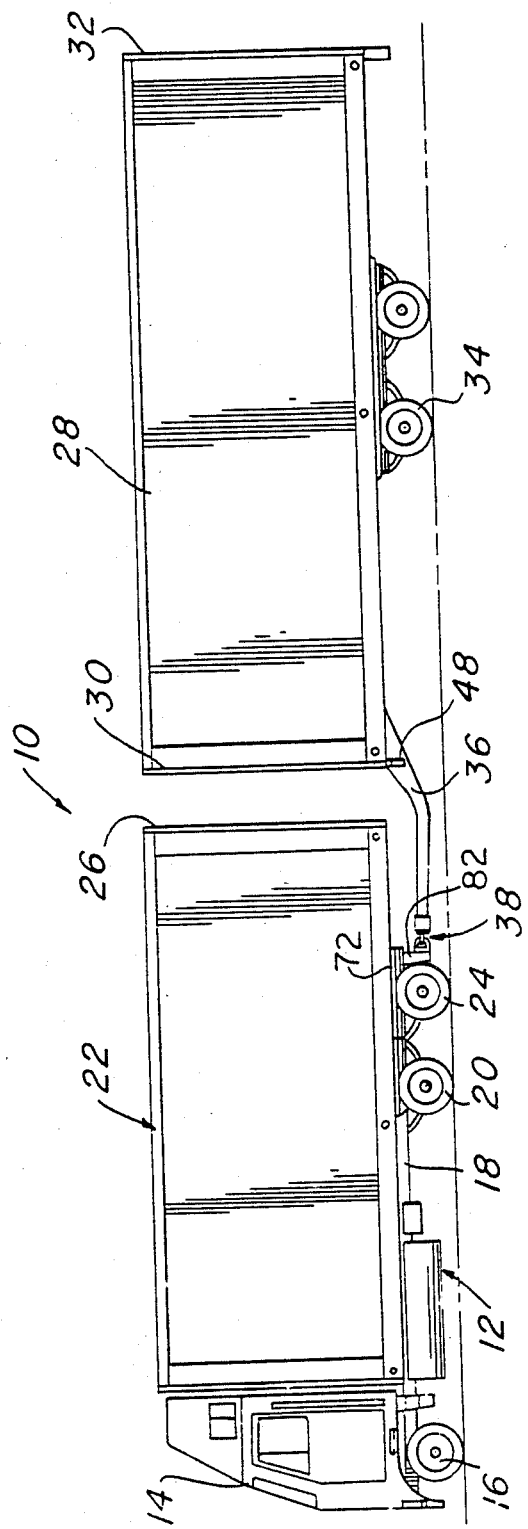
FIG. 1 is an elevational view of a preferred embodiment.
Figure 2:
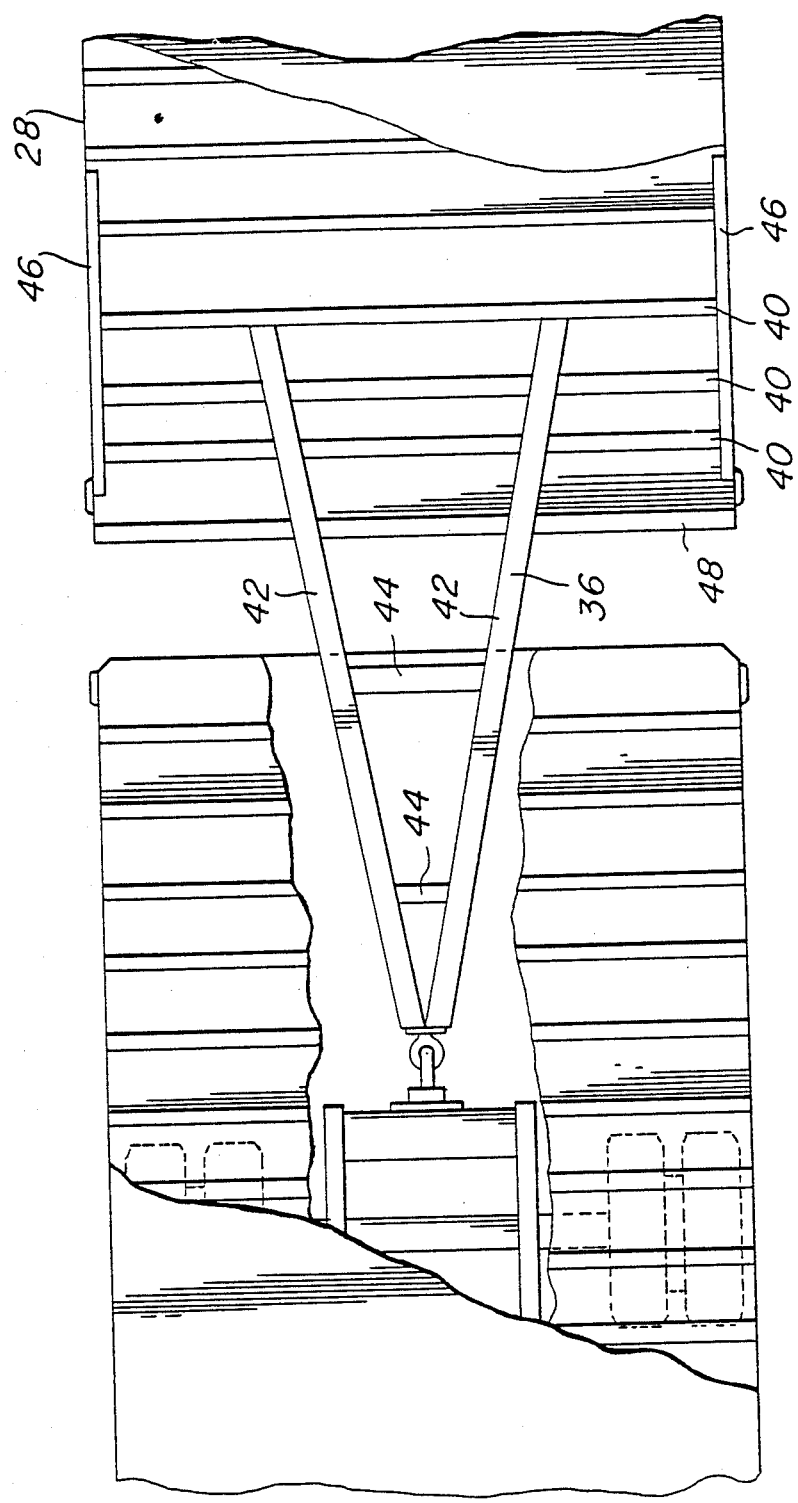
FIG. 2 is a top plan view of a preferred embodiment, parts broken away for clarity.

Referring to the drawings wherein like numerals indicate like elements, there are shown in the figures preferred embodiments of the present inventions.

Generally

Referring generally to FIG. 1, the preferred embodiment of the articulated tractor/trailer combination 10 is illustrated (landing gear not shown). A power unit 12 comprises a cab 14 mounted on a frame 18. Front wheels 16 are mounted to frame 18 in a conventional manner, and are located below and adjacent the cab 15. Rear wheels 20 are mounted to frame 18 in a conventional manner and are located adjacent to rear most end of the frame 18. Cab 14 is shown as "a cab over engine"-type design, but these inventions are not limited to that design.

A first cargo unit 22 is coupled to the power unit 12 in a manner which will be described in greater detail below. First cargo unit 22 is closely spaced to cab 14 and is not permitted to pivot on power unit 12. First cargo unit 22 includes at least one axle/wheel set 24 which is permanently mounted thereto. Those skilled in the art will understand that more than one axle/wheel set may be required depending upon the load carried by the first cargo unit. First cargo unit 22 includes first cargo unit doors 26. Doors 26 will be described in further detail below.

A second cargo unit is coupled to the wheel carrier 24 of first cargo unit 22. The coupling mechanism 38 will be described in greater detail below. Second cargo unit 28 includes forward doors 30 and rearward doors 32. The construction of forward doors 30 will be described in greater detail below. Rearward doors 32 are conventional. Second cargo unit 28 includes rigidly affixed second cargo axle/wheel set 34. Those skilled in the art will realize that the twin axle/wheel set shown may comprise any number of axles and wheels depending upon the load carried by unit 28. Each cargo unit may have an interior height of up to 124 inches.

A drawbar 38 is rigidly affixed to the forward end of second cargo unit 28. At the forward-most end of drawbar 36 is a portion of second cargo unit coupling mechanism 38. The drawbar 36 and coupling mechanism 38 will be described in greater detail below.

The Drawbar

Referring to FIGS. 1-4, the construction of drawbar 36 is disclosed. Drawbar 36 preferably comprises two lateral members 42 which are anchored at one end to cargo unit 28 and extend forwardly of said unit 28 and terminate at an apex. Drawbar 36, when viewed from the top plan view (see FIG. 2), is V-shaped. Drawbar 36, when viewed from the side elevation view (FIG. 3), includes an elongated, forward section or "tongue", a contoured or curved section, and a flared, upwardly extending section. The length of the tongue and curved section is critical and is preferably between about 84 3/16 inches and 97¼ inches. The draw bar is symmetrical. Lateral members 42 have an "I"-shaped vertical cross section.

To overcome the failure problem of the drawbar disclosed in U.S. Pat. No. 4,475,740, the lateral members 42 have been rigidly anchored to the forwardmost cross members 40 of the second cargo unit 28. Cross members 40 are typically box beams which extend across the width of the second cargo unit 28. The lateral terminal ends of cross members 40 are rigidly anchored to tie plates 46. Tie plates 46 may run along the entire length of the second cargo unit 28. The rigid connections between the rearward end of members 42, the cross members 40, and the tie plates 46 allows the distribution of the load in second cargo unit 28, thus significantly reducing failure of the drawbar 36.

Preferably, a bolster 48 is located below and adjacent the forward most edge of unit 28. Preferably, a pair of struts 44 are affixed between drawbar members 42.

First Cargo Unit Coupling Mechanism

Referring to FIGS. 5-8, the first cargo unit 22 coupling mechanism is illustrated. The first cargo unit 22 is releasably affixed to power unit 12. Unit 22 is not permitted to pivot on the power unit 12. Accordingly, cargo unit 22 may be closely spaced to the rear wall of cab 14.

Forward and rear landing gear 50 and 52 are disposed on the first unit 22, respectively. Power unit 12 is shown coupled to the first cargo unit 22. See FIG. 5.

In FIG. 6, landing gears 50 and 52 are shown in their lowered or deployed position, with power unit 12 disengaged from first cargo unit 22. A kingpin 54 is rigidly affixed, in a conventional manner, to said second cargo unit as shown in FIG. 6.

Referring to FIGS. 7 and 8, the first cargo unit coupling mechanism is explained. A fifth wheel 56 is fixedly mounted and flush with frame 18. Preferably, the fifth wheel 56 is about 35 inches off the ground which is lower than conventional fifth wheels. Fifth wheel 56 is adapted for releasable engagement with kingpin 54. Fifth wheel 56 may include any standard latching mechanism which is well-known to those of ordinary skill in the art.

A female coupling unit 59 is rigidly affixed to frame 18, in any conventional manner, at the rearwardmost end of the power unit 12.

Preferably, the female coupling unit comprises a pair of female connectors 62 (typically tubes) rigidly mounted in a connector plate 60. Weldments 64 are located at the lateral ends of the connector plate 60. Weldments 64 are provided for welding the connector plate to frame 18. A connector plate weldment 58 is horizontally disposed across lateral box members of frame 18. As can be appreciated from the above description, the female coupling unit must be securely affixed to the frame 18 of the power unit 12.

A male coupling unit 69 of the first cargo unit connecting mechanism is rigidly affixed to the first cargo unit wheel chassis 72. Wheel chassis 72 is rigidly affixed to cargo unit 22 is a conventional manner. A male connector plate 68 is rigidly affixed to the chassis 72 in a conventional manner. Weldments 70 are affixed at the lateral ends of plate 68 for securing plate 68 to chassis 72.

A pair of male connectors 66 are horizontally mounted upon plate 68 and are adapted for engagement with the pair of female connectors 62.

The combination of kingpin 54 engaged and latched into place on fifth wheel 56 and the male connector 66 engaged with female connector 62 rigidly affixes the first cargo unit 22 to the power unit 12.

To engage or disengage the power unit 12 from the first cargo unit 22 requires that the power unit be provided with an air suspension system (not shown) which allows the raising and lowering of frame 18. Such an air suspension system is well known to those of ordinary skill in the art. Landing gear 50, 52 of unit 22 is placed in its lowered position and is jacked up to raise unit 22 above its normal riding level on frame 18. The power unit 12 is backed under the unit 22 when it is in its lowermost position as provided by the air suspension system. Immediately prior to engagement, the power unit is raised, and the first cargo unit is lowered. Then, the male connectors 66 are inserted in the female connectors 62 and kingpin 54 engages fifth wheel 56. Kingpin 56 is latched within fifth wheel 56 thus completing the attachment of cargo unit 22 to power unit 12. Uncoupling is performed in a reverse manner.

Second Cargo Unit Coupling Mechanism

Referring to FIGS. 9–12, the second cargo unit coupling mechanism 38 is illustrated.

Eye 74 is rigidly mounted at the apex of drawbar 36. An eye mounting plate 80 is disposed between eye 74 and members 42 of the drawbar 36. Eye 74 may be mounted by a plurality of bolts 74. See FIG. 11.

A ring mounting 78 is securely affixed to said drawbar 36 in a conventional manner. A safety ring 76 is rigidly affixed to the mounting 78. A link 90 is permanently engaged with ring 76, a second link 90 which is affixed to first link 90 is engaged with a hook ring 88. Hook ring 88 is rigidly affixed to a safety hook 84. Safety hook 84 includes a latch 86. Hook 84 is adapted for engagement with a eye hook or ring 92. Eye hook or ring 92 is rigidly affixed to a mounting plate 83. Mounting plate 93 is rigidly affixed to mounting 82.

Mounting 82 is rigidly affixed to a torsional tube 100. Torsional tube 100 having an axis is rigidly affixed to first cargo unit chassis 72. Preferably, torsional tube 100 has half-inch wall and an 8 inch O.D. and is able to withstand 70,000 to 80,000 kip's. Torsional tube 100 is optional in the present invention. The torsional tube flexes to support the load of the second cargo unit in a manner known in the torsional tube art. More specifically, the torsional tube twists about its axis, as required, to provide a non-rigid coupling between the first and second cargo units.

Figure 10:
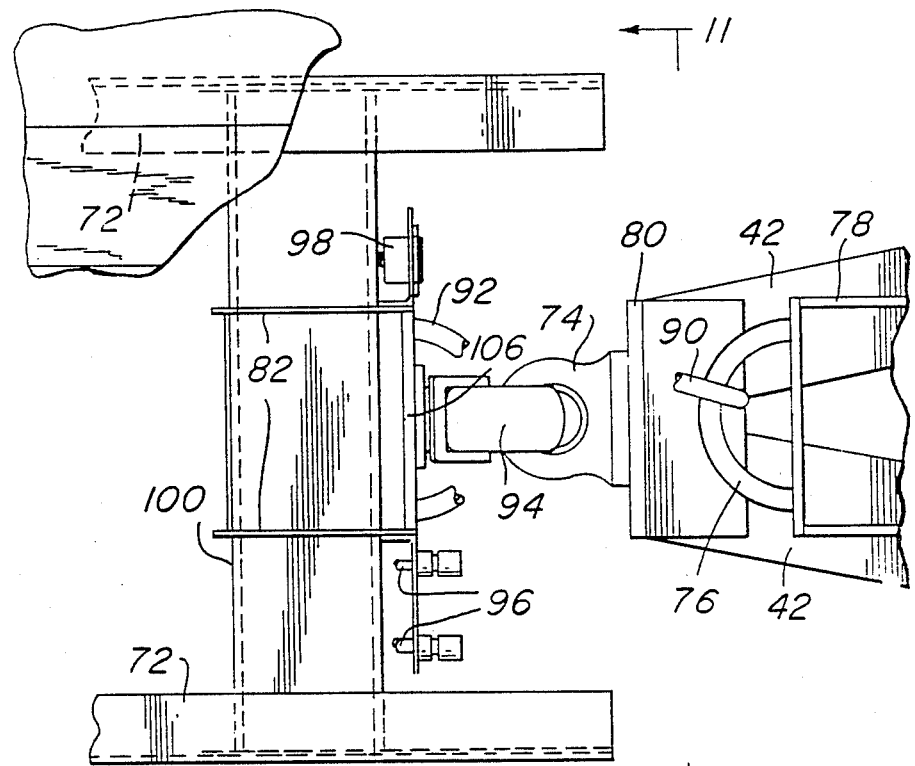
FIG. 10 is an enlarged top plan view of a preferred embodiment, parts being broken away for clarity.
Figure 11:
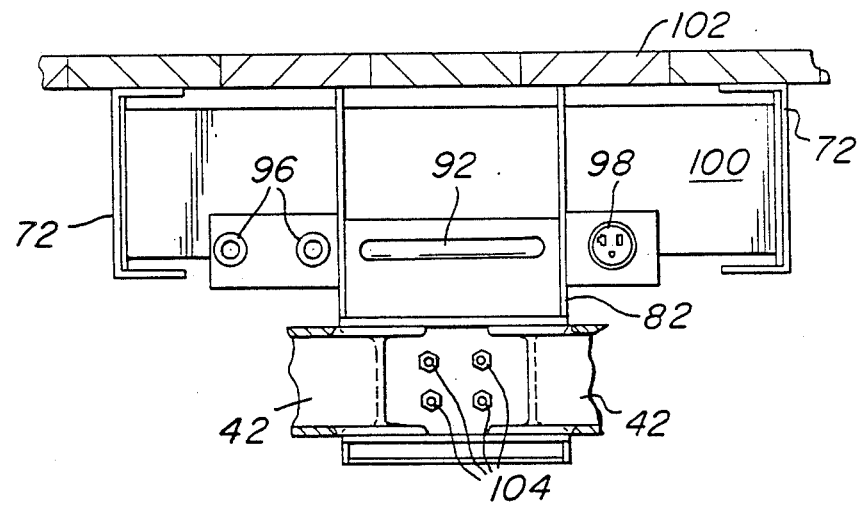
FIG. 11 is an enlarged sectional view taken generally along lines 11—11 of FIG. 10.

A coupler mounting plate 106 is secured between mountings 82 which are rigidly affixed to the torsional tube 100. As shown in FIGS. 3, 10 and 12, the mountings 82 extend generally vertically and radially outwardly from the torsional tube 100 for coupling the drawbar 36 to the torsional tube 100 at a location which is generally vertically downwardly displaced from its axis. As can be seen when viewing FIGS. 3, 10 and 12 together, due to the location of the mountings 82 with respect to the torsional tube 100, generally horizontal movement of the drawbar 36 results in an angular moment being applied to the torsional tube 100 through mountings 82 which in turn causes the torsional tube to twist about its axis in a manner well known in the torsional art. Coupler 94 is rigidly mounted to plate 106 in a known manner. Coupling 94 is adapted for releasably engaging eye 74. Preferably, hydraulic and/or pneumatic connections 96 and electrical connections 98 may be secured on mounting 82. These connections are provided to supply the necessary hydraulic air and electrical power to the second cargo unit 28.

The second cargo unit coupling mechanism 38 is rigidly mounted to the chassis 72 of the first cargo unit. A portion of the first cargo unit coupling mechanism is rigidly mounted to chassis 72. Accordingly, loads from the second cargo unit are distributed through the first unit chassis 72 and power unit frame 18.

In U.S. Pat. No. 4,475,470, it is suggested that the coupling point be anchored to the floor of the first cargo unit.

The Folding Doors

Figure 13:
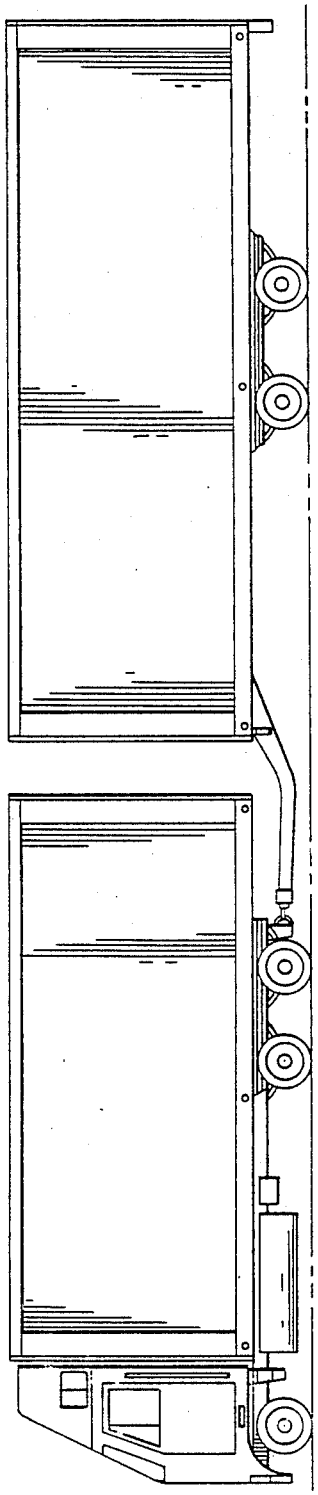
FIG. 13 is an elevational view of a preferred embodiment.
Figure 15:
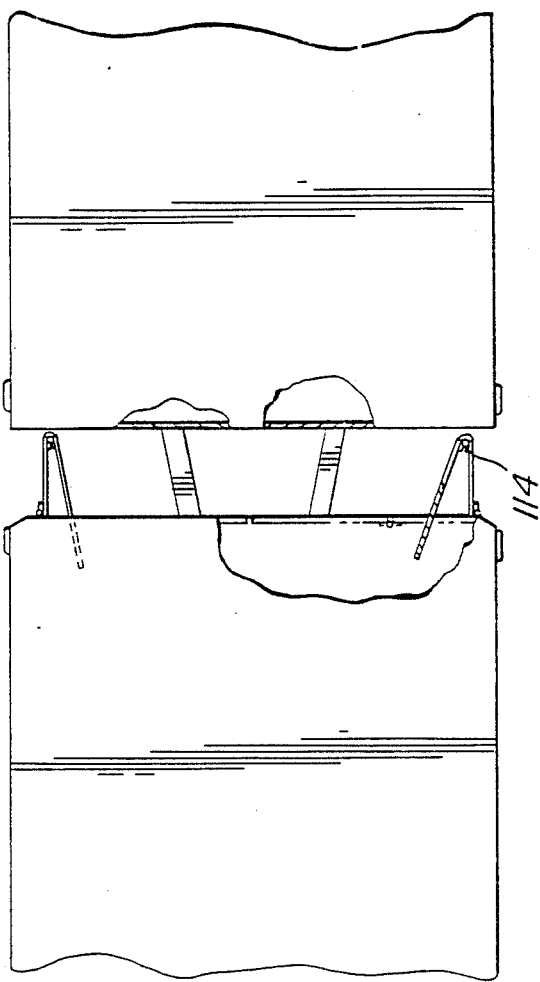
FIG. 15 is an enlarged top plan view of a preferred embodiment, parts being broken away for clarity.
Figure 14:
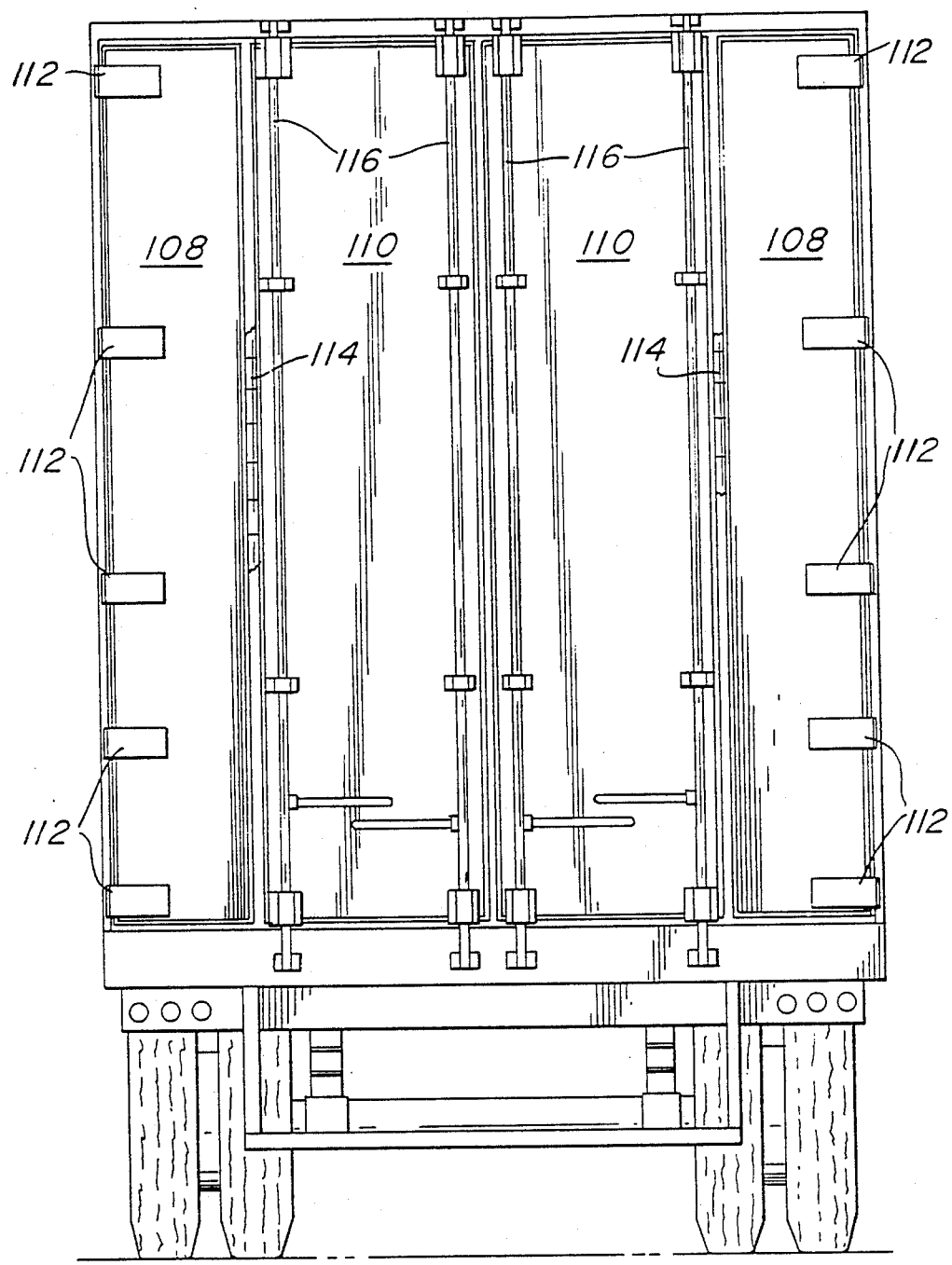
FIG. 14 is a rear elevational view of the preferred embodiment.

Referring to FIGS. 13–15, the preferred embodiment of the folding doors are illustrated.

The distance between first cargo unit 22 and second cargo unit 28 is between approximately 18 to 24 inches. The folding door 26 at the rearward end of unit 22 and the folding door 30 at the forwardmost end of second cargo unit 28 must be capable of being opened when second cargo unit 28 is connected to first cargo unit 22.

Referring to FIG. 14, door 26 or 30 is disclosed in detail. Each door unit includes a right and left half. Each half comprises a narrow outer panel 108 and an inner panel 110. Each half is affixed to the truck body by a plurality of external hinges 112. The outer panel 108 is pivotly mounted to the inner panel 110 by a continuous hinge 114 which is internally mounted and runs the length of the door. A plurality of level locks 116 are externally mounted to panel 110. Lever locks 116 are well known to those skilled in the art.

The width of panel 108 is slightly less than the distance between unit 22 and 28. See FIG. 15. Thus, when either door 26 or 30 need be open, the inner panel may be swung towards the side wall of the cargo unit, and the outer panel may be swung away from the opening.

Thus, cargo may be loaded from the rear end of the second unit 28 completely through to the forward end of the first unit 22. Additionally, this door construction allows the door halves to be folded through the gap between units 22, 28.

The Rollover Plates

Figure 17:
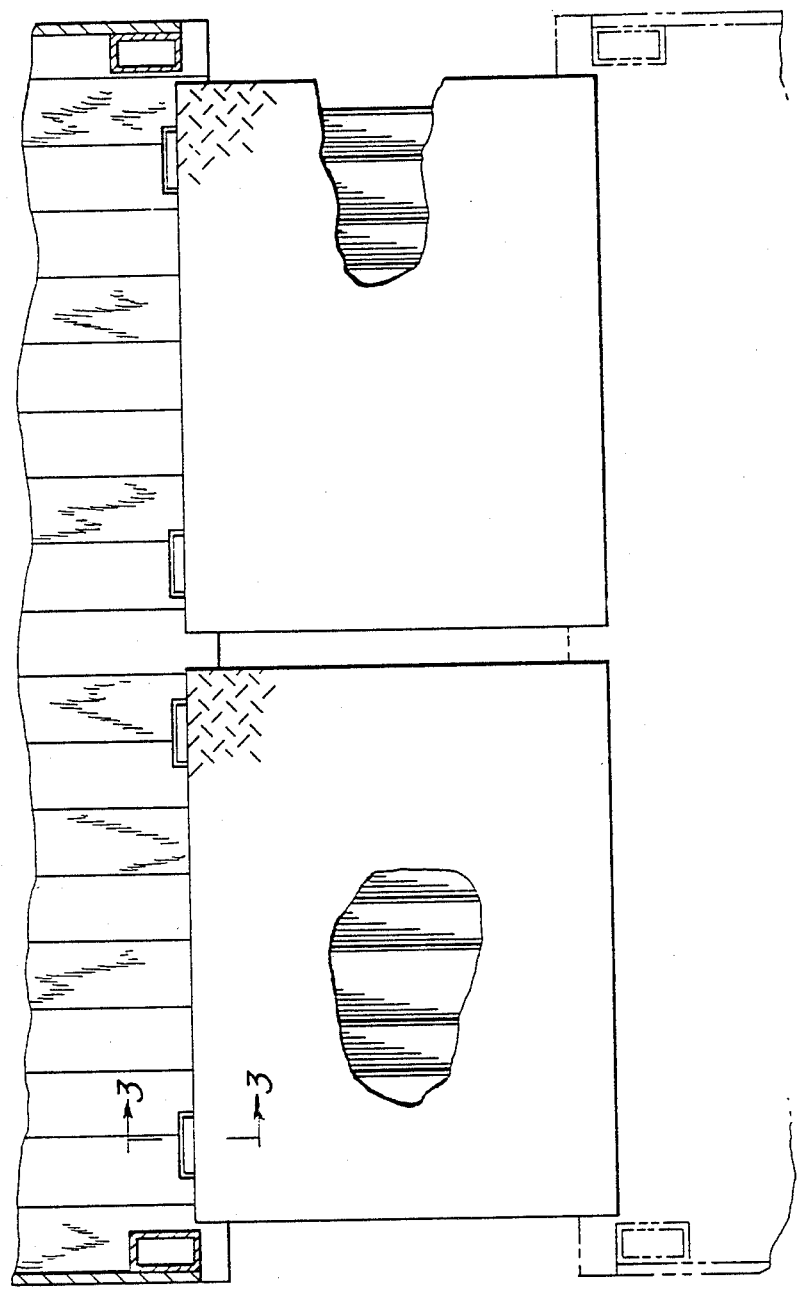
FIG. 17 is an enlarged top plan view of a preferred embodiment.
Figure 19:
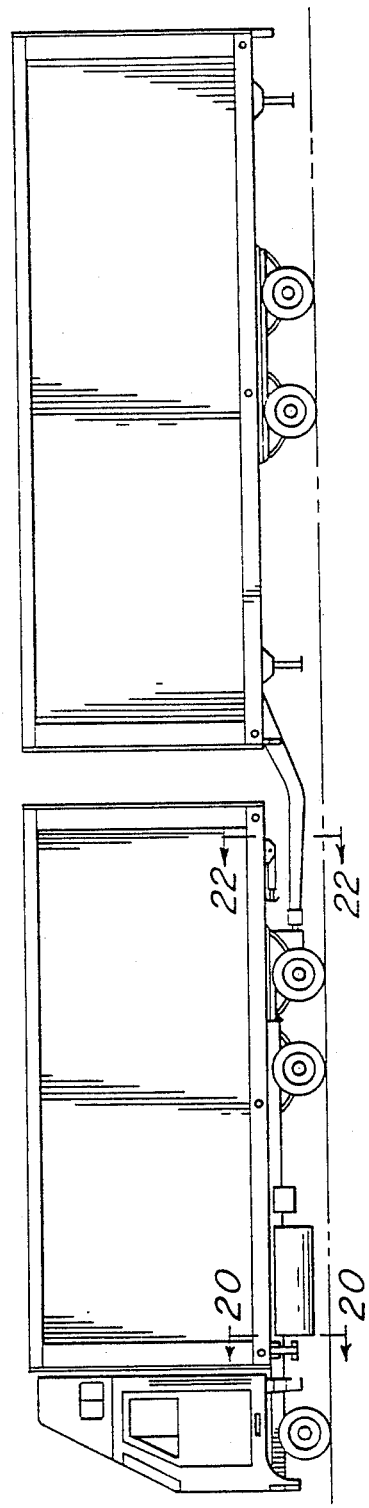
FIG. 19 is an elevational view of a preferred embodiment.

Referring to FIGS. 16–18, rollover plates 118 are shown. Rollover plates 118 are required to bridge the gap between cargo units 22 and 28. Rollover plates 118 are removably mountable between units 22 and 28. Preferably, a pair of rollover plates 118 are provided. See FIG. 17. Only one rollover plate 118 will be described in detail.

A surface plate 120, which preferably has a non-skid upper surface, is provided with a sufficient length to bridge the gap between unit 22 and 28 and overlap the floors of the cargo units. Rigidly affixed beneath plate 120 are a plurality of support members 122. Each support member 22 is provided for strengthening plate 120. Preferably, a cross member 124 is provided at the rearwardmost end of the first cargo unit 22. Cross member 124 includes a plurality of slots 126 cut therethrough. At one edge of plate 120 are provided a plurality of arcuate tongue 128. Each tongue 128 is adapted for pivotal engagement with slot 120. Rollover plates 118 are inserted and removed from first cargo unit 22 as shown in FIG. 18. Rollover plates 118 may be stored within unit 22.

The Landing Gear

Referring to FIGS. 19–23, the preferred landing gear is illustrated.

Figure 20:
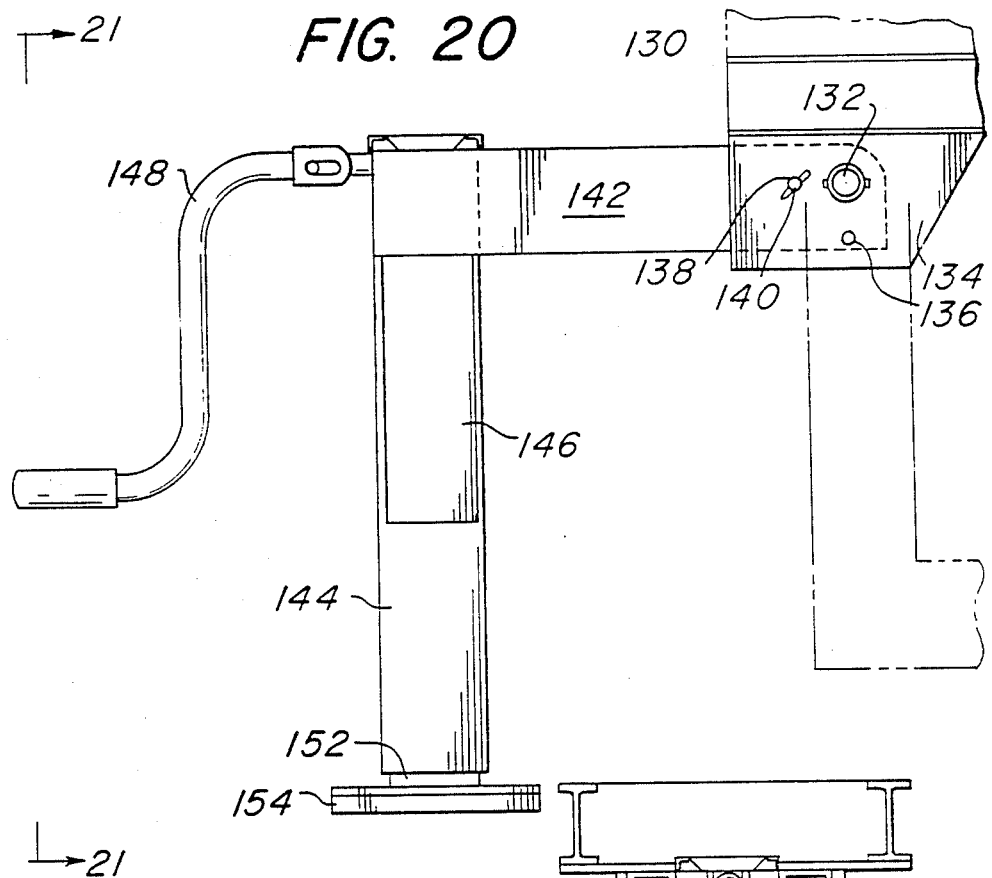
FIG. 20 is a sectional view taken generally along lines 20—20 in FIG. 19.
Figure 21:
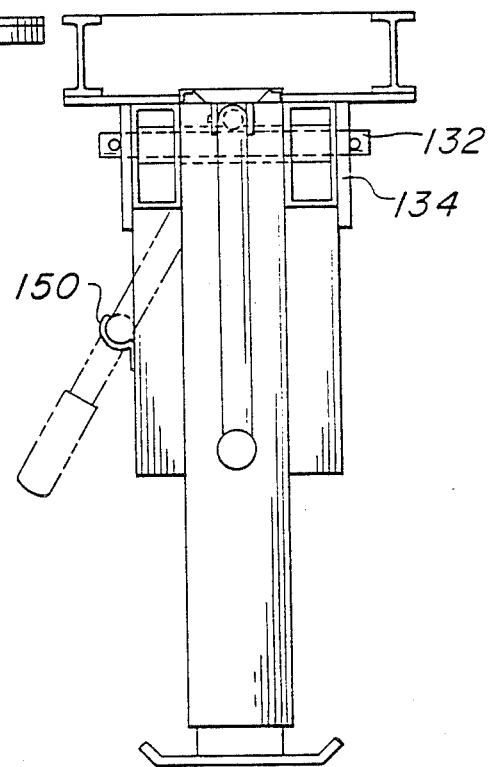
FIG. 21 is a sectional view taken generally along lines 21—21 in FIG. 20.

FIGS. 20 and 21 illustrate the landing gear which is preferably used at the forwardmost end of the first cargo unit 22. The landing gear is anchored adjacent to cross members 130. A pair of support plates 134 are fixedly mounted to the underside of cargo unit 22. Plates 134 are provided with a slot through which a pivot rod 132 may be placed. Furthermore, a storage hole 136 is located below pivot rod 132 and a deployment hole 136 is located horizontally spaced from said pivot rod 132. Holes 136 and 138 may receive a pin 140 which locks the landing gear in a storage or deploment position.

An arm 142 is pivotally mounted between plates 134. In FIG. 20, arm 142 is in the deployed position (solid lines) and is parallel to the ground. At the terminal end of arm 42, a leg 144 is rigidly affixed thereto at a right angle to arm 142. Affixed to either side of leg 144 are a pair of support members 146. Support members 146 are provided to increase the strength of the leg. An extendable leg 152 is telescoped within leg 144. A foot 154 is affixed to the lowestmost end of extendable leg 152. Extendable leg 152 is adapted for reciprocal movement within leg 144 and is actuated by a crank 148. Such cranking mechanisms are well-known to those with ordinary skill in the art. Though manual operation of the crank is illustrated, the cranking operation can be performed by other means such as hydraulic or pneumatic pressure cylinders. A storage clasp 150 is provided on support member 146 so that the crank can be stored when not used.

Figures 22, 23:
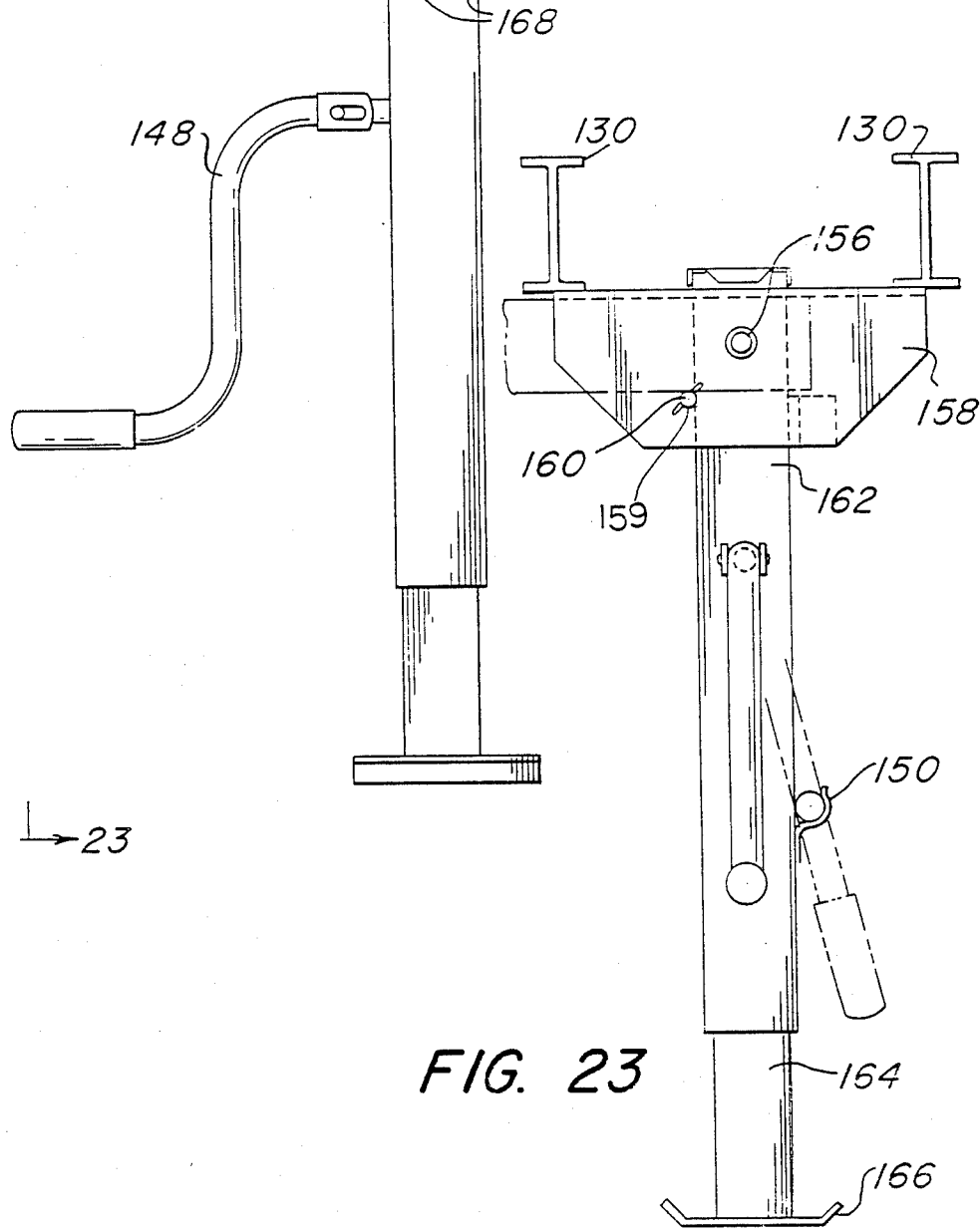
FIG. 22 is a sectional view taken generally along lines 22—22 in FIG. 19.
FIG. 23 is a sectional view taken generally along lines 23—23 in FIG. 22.

Referring to FIGS. 22 and 23, the landing gear located at the rearmost end of the first cargo unit 22 is illustrated.

The landing gear is supported on the undersurface of storage unit 22 between cross members 130. A pair of support plates 158 is provided with a hole for receipt of a pivot rod 156. A second hole 159 is provided through the plates for receipt of a securing pin 160. Securing pin 160 anchors the leg in a storage position (phantom line in FIG. 23). Between plates 158 are provided a pair of tabs 168 which limit the movement of a leg 162. Leg 162 is pivotally mounted between support plates 158. An extendable leg 164 is telescoped within leg 162. A foot 166 is located at the lowermost end of extendable leg 164. Extendable leg 164 is raised and lowered by manipulating crank 148. Crank 148 operates in a known manner. A clasp 150 is provided on leg 162 to secure the crank 148 in a stored position.

The present invention may be embodied in other specific forms without departing from the spirit or essential attributres thereof and, accordingly, reference should be made to the appended claims, rather than to the foregoing specification, as indicating the scope of the invention.

I claim:

1. A cargo-carrying vehicle comprising:

a power unit;

a first cargo-carrying unit releasably mounted on the power unit, the first cargo-carrying unit having a chassis and a torsional tube rigidly affixed to the chassis, the torsional tube having an axis;

a second cargo-carrying unit having a drawbar affixed thereto, the drawbar having one end extending from the second cargo-carrying unit, the drawbar including an eye affixed to the one end thereof and safety hook connected thereto; and means, including a mounting rigidly affixed to the torsional tube and extending generally vertically and radially outwardly from the torsional tube, the mounting including first and second generally parallel spaced arm members surrounding and rigidly affixed to the torsional tube and extending downwardly therefrom, a plate secured to the downwardly extending portion of each of the arm members, a coupler rigidly affixed to the plate for receiving the eye on the drawbar and a ring member affixed to the plate for receiving the safety hook, for releasably and pivotally coupling the one end of the drawbar to the torsional tube at a location displaced form the axis of the torsional tube, the torsional tube twisting about its axis, as required, in response to generally horizontal movement of the one end of the drawbar to provide a non-rigid coupling of the second cargo-carrying unit to the first cargo-carrying unit.

* * * * *